United States Patent [19]

Horner

[11] Patent Number: 4,783,339
[45] Date of Patent: Nov. 8, 1988

[54] PROCESS FOR MAKING INSTANT COOKING NOODLE PRODUCTS

[75] Inventor: Leonard W. Horner, Sewell, N.J.

[73] Assignee: Campbell Soup Company, Camden, N.J.

[21] Appl. No.: 811,284

[22] Filed: Dec. 20, 1985

[51] Int. Cl.$^4$ ............................ A23P 1/14; A23L 1/16
[52] U.S. Cl. .................................... 426/557; 426/446; 426/451; 426/467
[58] Field of Search ............... 426/557, 451, 445, 446, 426/447, 467, 443

[56] References Cited

U.S. PATENT DOCUMENTS

| | | | |
|---|---|---|---|
| 3,035,918 | 5/1962 | Sorgenti et al. | 426/467 |
| 3,038,813 | 12/1962 | Cording, Jr. et al. | |
| 3,192,049 | 6/1965 | Kinsley . | |
| 3,299,799 | 1/1965 | Heiland . | |
| 3,392,660 | 7/1968 | Cording, Jr. | |
| 3,456,576 | 7/1969 | Heiland et al. | |
| 4,098,906 | 7/1978 | Hisaki et al. | |
| 4,208,439 | 6/1980 | Hsu . | |
| 4,230,735 | 10/1980 | Yoshida et al. | |
| 4,234,617 | 11/1980 | Sakakibara et al. | |
| 4,243,689 | 1/1981 | Kokegachi et al. | |
| 4,243,690 | 1/1981 | Murakami et al. | |
| 4,271,205 | 6/1981 | Kaneko | 426/451 |
| 4,346,119 | 8/1982 | Braibanti | 426/557 |
| 4,368,210 | 1/1983 | Murakami et al. | 426/557 |
| 4,370,352 | 1/1983 | Murakami et al. | |
| 4,394,397 | 7/1983 | Lometillo et al. | |
| 4,423,082 | 12/1983 | Bauernfeind et al. | |
| 4,469,711 | 9/1984 | Seltzer . | |
| 4,495,214 | 1/1985 | Seltzer . | |
| 4,539,214 | 9/1985 | Winter et al. | |
| 4,540,590 | 10/1985 | Harada et al. | |

OTHER PUBLICATIONS

W. K. Heiland et al., "A Continuous Explosion Puffing System", *Food Technology*, 1977, pp. 32–36.

*Primary Examiner*—Donald E. Czaja
*Assistant Examiner*—Carolyn Paden
*Attorney, Agent, or Firm*—Banner, Birch, McKie and Beckett

[57] ABSTRACT

Non-fried, oil-free, instant cooking dry noodles are produced by the following process: (a) partially gelatinizing a noodle dough; (b) forming said partially gelatinized dough into discrete pieces of the desired shape; (c) surface drying said pieces, if necessary; and (d) suddenly vaporizing remaining moisture to expand the interior of the noodle and create a porous structure. These noodle products are precooked and can be prepared simply by immersing them in a hot edible liquid for a short period.

23 Claims, No Drawings

PROCESS FOR MAKING INSTANT COOKING NOODLE PRODUCTS

BACKGROUND OF THE INVENTION

1. Field of the Invention

This invention relates to non-fried, oil-free, instant cooking dry noodle products. More particularly, the invention relates to dry precooked noodles which can be rehydrated and made ready to eat by immersing them in a hot liquid for a short period. This invention also relates to a method of manufacturing said noodles.

2. Description of the Prior Art

Conventional, i.e., non-instant, noodle products are well known in the art. Typically, such noodle products are prepared by mixing flour and other ingredients to form a dough. This dough is then formed into desired shape by rolling, cutting, pressing, extruding, and other techniques well known in the art. These shapes are subsequently dried for storage. This drying hardens the discrete particles of shaped noodle products.

Conventional noodle products must be cooked in very hot liquid for about 10 to 20 minutes to prepare them for eating. This cooking causes alpha-conversion of the starch in the product. Alpha-conversion, also known in the art as gelatinization, occurs when water penetrates the polymeric structure of the starch granule, thereby freeing and hydrating the polymers and causing the starch to swell. When swelling is sufficient so that crystallinity is no longer observable and the polymers are fully hydrated, gelatinization is complete. Conventional noodle manufacturing processes do an insignificant amount, if any, of alpha-conversion, so the cooking period must be long. However, prior art noodle products marketed as "instant cooking" have greater than about 85% alpha-conversion. Therefore, the process of preparing instant noodles requires less time.

Various methods known in the art reduce the time required to prepare noodle products by increasing the degree of alpha-conversion before sale to the consumer. For example, noodle products prepared conventionally can be precooked and then either pasteurized or frozen and packaged. Such precooked products need only be heated before being served. However, because these products have a high water content, the alpha-converted starches undergo beta-conversion during storage. Beta-conversion, which completely cleaves the starch molecule into two molecules, causes the product to taste as if it had not been thoroughly cooked and is obviously undesirable. Additional disadvantages are that the pasteurized product has a short useful life and the frozen product must be maintained and stored under freezing conditions.

The problems associated with producing alpha-converted noodles products are known in the art. For example, is it well known in the art that highly gelatinized noodle products tend to stick together. However, few of the methods developed to overcome this problem yield noodle products which consistently have pleasing organoleptic qualities and commercially practical shelf lives and can be easily prepared by the consumer.

One unsatisfactory prior art method coats noodle products with edible oils or fats; see U.S. Pat. No. 4,098,906. Other methods fry the noodle products in oil, as in U.S. Pats. Nos. 4,230,735 and 4,393,397. However, oil will always be present in these noodle products and will oxidize, thereby producing rancity and off odors.

Other methods of producing instant cooking noodle products have also been developed. For example, U.S. Pat. No. 4,234,617 discloses that use of hydrolyzate of a starch derived from the root, stem, or stalk of certain plants yields a product which quickly absorbs water. Therefore, noodle products containing these starches rehydrate quickly. U.S. Pat. No. 4,423,082 discloses a method for manufacturing instant cooking pasta products wherein saturated steam is introduced into the dough (a combination of water and dry cereal flour). This mixture is then kneaded and extruded to produce some alpha-conversion. In a second extrusion step, which develops the desired shape of the particles, the exterior of the extruder is jacketed to cool the product.

Still another method, the addition of leavening agents, is disclosed in U.S. Pat. No. 4,469,711. A carbonate and an acidic leavening salt are added to a dough mixture. The entire mixture is extruded to product conditions of pressure and temperature which permit the reaction of the carbonate with the acidic leavening salt to product $CO_2$ within the body of the extruded noodle particle. This product is said to be a completely gelatinized product (the alphaconversion is 100%) which is slightly chewy upon reconstitution. The improvement disclosed in U.S. Pat. No. 4,495,214, wherein an "interrupter" is added to the dough made and processed in the fashion described in U.S. Pat. No. 4,469,711, is useful in improving the texture. Both techniques are coplex and yield a less satisfactory product.

Various other methods produce a porous structure within the noodle product particle. For example, U.S. Pat. No. 4,243,689 teaches a process wherein a dough web is steamed until the alpha-conversion is at least 93%, after which the web is predried, shaped, and finished dried. U.S. Pat. No. 4,370,352 requires an 85% alpha-conversion before the web is further processed and discloses that the resulting noodle product has a pore volume of 0.07 to 0.40 ml/g. U.S. Pat. No. 4,243,690 discloses a process wherein the dough is steamed until the alpha conversion is between 60 and 80%. The resulting product is shaped, and then steamed again until the desired alpha-conversion of 90% is attained. Another method requires that the porous structure be developed within the dough sheet before the desired shapes are cut therefrom so that the porous structure is exposed at the cut edges; see U.S. Pat. No. 4,208,439.

It is an object of this invention to provide non-fried, oil-free, instant cooking dry noodle products which can be prepared by immersing them in hot edible liquid for a short period, thereby yielding an organoleptically pleasing food product.

It is a further object of this invention to provide such products which have a very high pore volume.

Another object of this invention is to provide a method for manufacturing such noodle products.

SUMMARY OF THE INVENTION

In accordance with these and other objectives, this invention relates to a process for the production of non-fried, oil-free, instant cooking dry noodle products comprising the steps of (a) partially gelatinizing a noodle dough; (b) forming said partially gelatinized dough into discrete pieces of the desired shape; (c) surface drying said pieces, in necessary; and (d) suddenly vaporizng remaining moisture to expand the interior of the noodle and create a porous structure.

The present invention also relates to the instant noodle products produced by the foregoing process. These instant noodle products will be precooked and can be prepared for consumption simply by immersing them in a hot edible liquid for a short period. Further heat need not be supplied to the liquid during this immersion.

DETAILED DESCRIPTION OF THE INVENTION

As used throughout the specification and claims, the term "noodle" includes all products known in the art to be made from doughs which are primarily flour and water, to which other adjuvants such as eggs, salt, and other spices are added. These products are not limited with respect to shape and shapes such as stars, numerals, letters, elbows, and the like, are within the scope of this invention. Moreover, the term "noodle" should not be limited only to those products which meet the Standards of Identity in C.F.R.

The present invention is based on the discovery that improved non-fried, oil-free, instant cooking dry noodle products can be made by expanding the interior portion of precooked noodles and creating a large pore volume. It has been discovered that a highly porous structure can be developed within the interior of the noodles by treating individual noodle product pieces so that the moisture in the interior portion of the pieces is quickly vaporized. These porous instant noodle products can be rehydrated quickly by immersing them in a hot edible liquid. They do not need to be cooked, i.e., the liquid need not be maintained at a boil by application of heat.

Dough comprising any combination of conventional dough ingredients can be processed according to this invention to produce instant noodle products. Typically, doughs are made from flour and water, with egg, salt, and various spices as common adjuvants. Various vegetables are sometimes added.

Although various flours are acceptable, it is preferred for the purposes of this invention to use extra fancy durum patent flour, semolina, or combinations of approximately equal proportions thereof. It is especially preferred to use solely extra fancy durum patent flour. Not only is the instant noodle product produced from this material found by consumers to be organoleptically superior, but also extra fancy durum patent flour is usually less expensive than the other acceptable starch source ingredients.

If egg is added to the dough it may be in any form. For example, whole fresh eggs, powdered eggs, whole or dried egg fractions (whites or yolks), or the like, or any combination thereof, are suitable. Vegetables must be in a form suitable for incorporation into noodle dough.

The consistency of the dough which can be processed in accordance with this invention can vary over a wide range. Dough having a consistency which can be processed in equipment commonly used in the art can be utilized herein. Dough having a moisture content of between about 22 to 40 wt % is preferred for this invention. This range of moisture content has been found to yield dough of a consistency which is neither "soupy" nor so "stiff" that the dough cannot be utilized in processing equipment.

The dough can be prepared in any manner and in any equipment known in the art to be suitable for the purpose. Doughs can be mixed just until uniform, or can be kneaded, i.e., further worked and stretched, and then compressed back into uniform mass. In the practice of this invention it has been discovered that kneading makes the resultant instant noodle product somewhat tougher than the nonkneaded product. For the purposes of this invention, kneading is acceptable but is not preferred.

When the dough has reached the desired degree of uniformity, it must be further processed. As is well known in the art, the dough can be extruded or rolled. Extrusion can utilize a high pressure differential, thereby heating the dough and causing it to cook. Alternatively, the dough can be extruded with a minimum of heating by utilizing only a small pressure differential. However, in the practice of the method of this invention, extruded doughs yield instant noodle products which have a less desirable surface texture than do instant noodle products produced from a dough which has been rolled into a sheet. Further, low pressure differential extrusions tend to become sticky when partially gelatinized. Stickiness is undesirable because it causes the particles to stick together during subsequent processing, thereby complicating the process and lowering the quality of the instant noodle product. Therefore, it is preferred that the dough be rolled into a sheet.

Methods of preparing a sheet are well known in the art. Although any method can be utilized in this invention, it is preferred to process the dough through a series of rollers. The rollers are placed in increasingly closer relationship without contacting each other so that as the dough is processed through the series of rollers, it is made thinner. This technique is well known in the art. For example, a Pasta World sheeter in combination with a Toresani double roll laminator an be utilized to produce the sheet.

The thickness of the sheet can be selected by the manfucturer to accommodate product criteria and equipment limitations. For example, a too-thin sheet would be difficult to manipulate with mechanical equipment and a too-thick sheet might produce a product less desirable to consumers. For the purposes of this invention, the preferred sheet thickness is between about 0.010 to 0.075 inch. A more preferred range of thickness is between about 0.020 to 0.050 inch, and the most preferred range is between about 0.030 to 0.040 inch.

This processed dough is then partially gelatinized. The preferred range of gelatinization completeness is between about 20 to 60%, and more preferably is between about 30 to 50%. The dough can be partially gelatinized by the heat generated by a high pressure differential extrusion, or by steaming the dough.

It is preferred, for the purpose of the invention, to steam the processed dough steam chamber. Such devices are well known in the art. Live steam can be injected directly into the chamber through various types of distributors, such as but not limited to fan-type nozzles, manifolds with a plurality of orifices, and the like, or steam can be utilized to heat a layer of water in the bottom of the chamber, thereby producing steam. Either technique is acceptable and gelatinizes the processed dough.

Typically, the dough to be treated is placed on a belt and conveyed to the chamber. Dough having the most preferred thickness should preferably be treated for about 1½ to 3 minutes, most preferably for about 2 minutes. It has been found that this treatment results in a degree of gelatinization of about 30 to 50%. The preferred steam pressure is super atmospheric but less than about 6 psig, and most preferably about 1 to 4 psig.

After the dough is steam-treated, it is surface dried to remove tackiness in preparation for forming into discrete pieces. Various methods of providing heat for the surface drying, including infra-red, microwaver, and hot air circulation, are well known in the art. For the purposes of this invention, infra-red heating is preferred. Upon completion of the surface drying, the moisture content is preferably about 16 to 27 wt %, more preferably about 16 to 23 wt %, and most preferably about 19 to 22 wt %, based on the weight of the surface dried product.

If the moisture level of the dough is too low, i.e., if during the surface drying too much moisture is removed, the efficacy of the subsequent expansion step is reduced. A low moisture level indicates that not only the surface but also the interior of the pieces has been dried. Such over-dried dough yields an instant noodle product which does not rehydrate as quickly as desired and is firmer to the bite than is an instant noodle product developed from a properly surface dried dough.

The degree of porosity developed in the instant noodle product is affected by the distribution and amount of moisture in the discrete pieces. Therefore, an over-dried piece does not contain a sufficient quantity of moisture to develop a sufficient pore volume during the subsequent internal expansion step. Further, remoistening an over-dried piece produces a less satisfactory instant noodle product. Although the inventors do not limit themselves to this theory, it is believed that added water will not be absorbed evenly within the piece, and so will not provide the additional internal moisture necessary to develop the internal pore structure. Further, an excessively moist surface will cause the particles to stick together because the starch is drawn to the surface. In either event, the result is unsatisfactory.

The surface dried dough should now be formed into the discrete pieces of the shape desired. Any method of making shapes known in the art can be utilized in this invention. For example, a sheet can be stamped to produce shaped pieces such as, but not limited to, stars, letters, numerals, and the like. Alternatively, a sheet can be slitted into traditional noodle shpaes, i.e., pieces having a rectangular or ribbon-like appearance. A shaped extrusion would be cut to desired lengths. All these techniques are well known in the art.

If there is excessive moisture on the surface of the dough, making the surface sticky, or the dough is too warm to be properly processed in a particle-shaping device, the dough can be cooled slightly by circulating air around it. The technique of cooling the dough and the equipment in which it is done are well known in the art. Circulation of air removes the surface moisture and, if the dough is too warm to be handled properly, the air circulation will cool the dough slightly so that it becomes firmer and easier to handle.

If the moisture content of the dough is greater than about 23 wt % based on the weight of the discrete pieces, an additional surface drying step is required. The degree of porosity developed in the instant noodle product is affected by the distribution and amount of moisture in the discrete piece. Therefore, a moisture level in excess of about 23 wt % based on the weight of the discrete piece makes the subsequent internal expansion step difficult because the noodles will stick together. This makes fluidization difficult because clumps of mutually-adhering pieces are irregularly shaped and have a disproportionally high mass to apparent surface area (i.e., the surface area which is effective to produce a suspending force in the fluidized bed) ratio than do single pieces. Further, instant noodle product quality is degraded because internal expansion does not occur wherever noodles stick together. These clumps yield an instant noodle product which is difficult to rehydrate and firmer to the bite than the product of a properly dried dough.

Upon completion of the surface drying, the preferred range of moisture level is about 16 to 23 wt % based on the weight of the surface dried particle; a more preferred range is 19 to 22 wt %. If additional surface drying is required, any suitable drying process is acceptable. The preferred embodiment of this invention utilizes a fluidized bed dryer. Such equipment is well known in the art. Typically, about two minutes of exposure to gas, preferably air, at 125° F. has been found to be sufficient to reduce the moisture level to the more preferred level of 19 to 22 wt %, based on the weight of the surface dried product.

The individual noodle pieces which have a moisture level preferably between about 16 to 23 wt % based on the weight of the piece, and more preferably between about 19 to 22 wt % on the same basis, are now ready for the internal expansion step. It has been discovered that an instant noodle product having a very high porosity can be produced by rapidly vaporizing moisture remaining in the particle. As the suddently-vaporized moisture escapes from the interior of the particle through the surface-dried outer portion, the network of pores is developed.

The interior expansion is preferably carried out in a version of a continuous belt fluidized bed indexing oven. The noodles are fluidized in hot gas, preferably air, above a grid. An endless horizontal belt is fitted with flights, i.e., members as wide as the belt which are mounted on the belt perpendicular to its surface and extending substantially from the belt to the grid. The flights ensure that the fluidized noodles are indexed, i.e., moved through the fluidizing hot gas. In the preferred form of this apparatus, flights are modified to ensure that noodles are not caught or crushed between the flight and the grid by providing means for redirecting the fluidizing gas in the vicinity of the intersection of the flight and grid. A wide range of time/temperature relationships is suitable for the purposes of this invention; the time should be shortened as the temperature is raised. A time/temperature relationship of about 40 to 2 seconds at about 300° to 500° F. is preferable, and 8 to 12 seconds at about 425° to 475° F. is more preferred.

An alternative to the fluidized bed for rapidly vaporizing moisture in the pieces is an explosion puffer developed for the United States Department of Agriculture and described in U.S. Pat. Nos. 3,299,799, 3,392,660, and 3,456,576. This device flashes the superheated liquids in the product to vapor by rapid depressurization.

The expanded instant noodle product is then dried in the conventional noodle dryer, if necessary, until the moisture content is preferably less than about 8 wt % based on the weight of the dried instant noodle product, and more preferably between about 2 and 7 wt %, and most preferably between about 4 and 6 wt %. Approximately 30 to 45 minutes of exposure to hot gas, preferably air, at 150° F. is required to reduce the moisture level to the most preferred level. If the product is over-dried, off flavors may develop. Also, ingredients having higher moisture levels which are packaged with the instant noodle product might be deleteriously affected if moisture migrates from those ingredients to the drier instant noodle products. Further, disparate levels of moisture among products in the same package might cause clumping.

The only steps of the process which make significant contributions to the alpha-conversion of the noodle are the steaming and the internal expansion. The typical alpha-converson level is less than about 50% after extrusion or steaming and is less than about 80% after the internal expansion. Only an insignificant amount, if any, of the alpha-conversion occurs during the subsequent rehydration.

The instant noodle products produced by the process described herein will have a very high pore volume. This porosity allows the rehydrating fluid to quickly wet surfaces far into the interior of the particle, thus producing an instant noodle product which has desirable organoleptic properties even though the alpha-conversion is less than about 80%. The pore volume of the instant noodle product prepared in accordance with the preferred embodiment of this invention is typically greater than 0.40 ml/g, more preferably greater 0.55 ml/g, preferably greater than about 0.70 ml/g, and most preferably greater than about 0.75 ml/g. Further, the surface is not glassy, but is textured without bubbles or other surface deformations, thereby providing not only additional surface area for rehydration, but also a pleasant sensation in the month.

The instant noodle products produced by the methods of this invention rehydrate within three minutes when immersed in hot edible liquid. Any edible liquid is satisfactory, but water and soap bases are typically utilized. Further, the quantity of liquid is limited only in that it must be at least equal to the quantity required to rehydrate the noodles.

The following examples further illustrate the invention. Throughout these examples, the world "parts" refers to parts by weight.

EXAMPLE 1

A liquid mixture of 246 parts of water, 40 parts of whole dried egg, and 29 parts of salt was prepared in mixing tank. Six hundred eight-five parts of extra fancy durum patent flour were charged to a dough mixer manufactured by Food Equipment Company. The timer on the mixer was set so that the mixer would run for 10 minutes, during which time the liquid mixture was slowly metered into the mixer. The resulting dough was of uniform consistency. The dough was transferred to a Pasta World dough sheeter. The dough sheet produced by the sheeter was ⅜ inch thick and 9½ inches wide and was rolled onto a wooden dowel for future use.

The rolled dough sheet was transferred to a Toresani double roll laminator, and the thickness of the sheet was reduced to 0.035 inch. The sheet was fed onto the conveyor belt which carried the dough sheet through the steaming chamber. The sheet was steamed over a water bath for two minutes. The sheet had 31% gelatinization and approximately 32% moisture content when it left the steam chamber.

The steamed dough was then passed through a series of infrared heaters and was subsequently cooled and further surface-dried by circulating air around the steamed dough. This reduced the moisture content to approximately 28% and increased the gelatinization to approximately 35%. This surface-dried material was cut into strands 2.5 mm wide in a slitter. The strands were cut into discrete noodle pieces having a length of between about ⅞ and 1⅛ inch.

The discrete pieces were then conveyed to a fluid bed dryer and further dried to a moisture content of approximately 20 wt % based on the weight of the dried noodles by exposing the discrete pieces to 125° F. fluidizing air for 2 minutes. Ambient air fluidization was utilized to transfer the pieces to the hot fluidized bed. The pore structure was developed in an indexing fluidized bed by exposing the noodle pieces to 450° F. air for about 16 seconds. The internally expanded noodle pieces were again fluidized in ambient air to cool them slightly.

The internally expanded noodle pieces had a moisture content of about 10% after completion of the above described processes. The noodle pieces were further dried in a Wyssmont drier by circulating air at a temperature of 150° F. for 30 minutes. The moisture content of the noodles so treated was 5%.

Finished noodles were tested by rehydrating 12 grams of noodles in 6 ounces of boiling water. These rehydrated noodles were organoleptically satisfactory within about 3 minutes. Samples were also prepared by mixing the noodles with a chicken flavored soup base and chicken meat to insure satisfactory rehydration in this medium.

EXAMPLE 2

The procedure of Example 1 was followed, except that steam at 6 psi was injected directly into the steam chamber through a manifold which contained a plurality of 3/32 inch holes. Equally satisfactory results were obtained.

EXAMPLE 3

The process of Example 1 was used to make noodles 1.5, 2.5, 3.5, and 5 mm wide, with lenghts of 1 to 3 inches. Each form yielded an organoleptically pleasing, fully rehydrated noodle in about 3 minutes.

EXAMPLE 4

Three competitive instant cooking dry noodle products and one "quick-cooking" dry noodle product were compared with the product of this invention in a comparative test. Each instant cooking product was rehydrated for 3 minutes with boiling water. No flavorings were added. The 3 minute rehydration was adequate to produce an edible product, except for the "quick-cooking" product, which was boiled in water for 4 minutes in accordance with the cooking directions.

The re-hyrated products were compared in blind tests both organoeleptically and by physical examination. The following characteristics and observations were made by the testers:

Yang Fong Foods - "quick-cooking" noodle

Texture was not uniform. Firm, chewy areas within the cooked noodle.

Seltzer - Product of U.S. Pat. No. 4,495,214

Texture of outer surface was bubbled, and edges of noodle were ragged. Product became very soft and had a very atypical taste.

Canadian Product

Rather than completely rehydrating, noodle become gummy and disintegrated.

European Product

Very small and atypical appearance. Became gummy and did not have a good noodle taste.

Products of this Invention

The products of this invention was found to yield an organoleptically and physically superior product. Not only did noodle products rehydrate within 3 minutes, but also they were found to have a superior taste. The texture was uniform and fully re-hydrated, and no tough or chewy spots were found in the re-hydrated noodle. The flavor was also found to be superior to the flavors of the abovedescribed products.

Although preferred embodiments of this invention have been discussed herein, those skilled in the art will appreciate that changes and modifications may be made without departing from the spirit of this invention as defined in and limited only by the scope of the appended claims.

I claim:

1. A method of producing non-fried oil-free instant cooking dry noodle products comprising:
   (a) partially gelatinizing a noodle dough;
   (b) forming said partially gelatinized noodle dough into discrete pieces of the desired shape having a moisture content less than about 23 wt % based on the weight of said pieces; and
   (c) subjecting said pieces to fluidization in hot gases or to explosion puffing to suddenly expand the interior portions of said pieces and create a porous structure by vaporizing moisture therein, said expanded pieces having an alpha-conversion of less than about 80% of any starches present.

2. The method of claim 1 wherein said sudden expansion is achieved by fluidizing said pieces for between about 40 to 2 seconds in hot gas at a temperature of between about 300° to 500° F.

3. The method of claim 2 wherein said sudden expansion is achieved by fluidizing said piece for between about 18 to 12 seconds in hot gas at a temperature of between about 425° to 475° F.

4. The method of claim 1 wherein the noodle dough is partially gelatinized by steaming after being formed into a sheet by rolling.

5. The method of claim 1 wherein said discrete pieces of step (b) have a moisture content of between about 19-22 wt % based on weight of said pieces.

6. The method of claim 1 wherein the pieces of step (b) are surface-dried to a moisture content of less than about 23 wt %.

7. The method fo claim 1 wherein said noodle dough of step (a) is partly gelatinized by steaming after being formed into a sheet by rolling, and said pieces of step (b) have a moisture content of between about 19-22 wt % based on the weight of the noodle.

8. The method of claim 7 wherein the moisture content of the noodle product is further reduced to between about 4 to 6 wt % based on the weight of the dried noodle product.

9. A method of producing non-fried oil-free instant cooking dry noodle products comprising:
   (a) preparing a sheet of noodle dough having a degree of gelatinization of at least about 20%;
   (b) surface drying said partially gelatinized sheet;
   (c) forming said surface dried sheet into discrete pieces of the shape desired having a moisture content of less than about 23 wt % based on the weight of said pieces; and
   (d) subjecting said pieces to fluidization in hot gas or to explosion puffing to suddenly expand the interior portions of said pieces and create a porous structure by vaporizing moisture therein, said expanded pieces having an alpha-conversion of less than about 80% of any starches present and a moisture content of less than about 8 wt % based on the weight of the dry noodle product.

10. The method of claim 9 wherein the thickness of said sheet of step (a) is between about 0.020 and 0.050 inch.

11. The method of claim 10 wherein the thickness of said sheet of step (a) is between about 0.030 and 0.040 inch.

12. The method of claim 9 wherein the degree of partial gelatinization in step (a) is between about 20 to 60%.

13. The method of claim 12 wherein the degree of partial gelatinization in step (a) is between 30 to 50%.

14. The method of claim 9 wherein the partial gelatinization in step (a) is achieved by steaming at a pressure of up to about 6 psi for between about 1½ to 3 minutes.

15. The method of claim 9 wherein the discrete pieces of step (c) have a moisture content of between about 19-22 wt % based upon the weight of the discrete pieces.

16. The method of claim 9 wherein the pieces of step (c) are surface dried to a moisture content of less than abouot 23 wt % to harden the surface and substantially eliminate tackiness thereof wihtout overdrying the interior portions of the pieces.

17. The method of claim 9 wherein the dough of step (a) is partially gelatinized by steaming.

18. The method of claim 9 wherein said sudden expansion is achieved by fluidizing said discrete pieces for between about 40 to 2 seconds in hot gas at a temperature between about 300° to 500° F.

19. The method of claim 18 wherein said sudden expansion is achieved by fluidizing said discrete pieces for between about 18 to 20 seconds in hot gas at a temperature between about 425° to 475° F.

20. The method of claim 19 wherein the ultimate moisture level is between about 4 to 6 wt % based on the weight of said dry noodle product.

21. The method of claim 9 wherein the thickness of the sheet of step (a) is between about 0.020 to 0.050 inch and the moisture content of said discrete pieces of step (c) is between about 19 to 22 wt % based on the weight of said discrete pieces.

22. The method of claim 9 wherein the thickness of said sheet of step (a) is between about 0.020 to 0.050 inch, the moisture content of said discrete pieces of step (c) is between about 19 to 22 wt % based on the weight of said discrete pieces and the exterior surfaces of said discrete pieces are substantially free of tackiness.

23. The method of claim 22 wherein the ultimate moisture content of the noodle product is reduced to between about 4 to 6 wt % based on the weight of said dry noodle product.

* * * * *